US005768283A

United States Patent [19]
Chaney

[11] Patent Number: 5,768,283
[45] Date of Patent: Jun. 16, 1998

[54] DIGITAL PHASE ADJUSTMENT CIRCUIT FOR ASYNCHRONOUS TRANSFER MODE AND LIKE DATA FORMATS

[75] Inventor: Thomas J. Chaney, St. Louis, Mo.

[73] Assignee: Washington University, St. Louis, Mo.

[21] Appl. No.: 336,269

[22] Filed: Nov. 8, 1994

[51] Int. Cl.$^6$ ............................. G06K 5/04; G11B 5/00; G11B 20/20

[52] U.S. Cl. ................... 371/1; 371/62; 371/5.4; 371/47.1; 370/503; 370/514; 370/516; 370/517; 370/395

[58] Field of Search ............... 371/1, 2, 61, 62, 371/42, 46, 5.4, 47.1; 360/26; 370/91, 13, 100.1, 108, 102, 105.3, 503, 514, 516, 517, 395; 375/224, 354

[56] References Cited

U.S. PATENT DOCUMENTS

| | | | |
|---|---|---|---|
| 4,677,618 | 6/1987 | Haas et al. ..................... | 371/1 |
| 4,700,347 | 10/1987 | Rettberg et al. . | |
| 4,791,652 | 12/1988 | McEachern et al. ............. | 375/111 |
| 4,833,695 | 5/1989 | Greub .............................. | 375/118 |
| 4,965,797 | 10/1990 | Yamane et al. ................. | 370/112 |
| 5,103,466 | 4/1992 | Bazes . | |
| 5,313,501 | 5/1994 | Thacker ........................... | 375/117 |
| 5,341,405 | 8/1994 | Mallard, Jr. ..................... | 375/120 |
| 5,369,640 | 11/1994 | Watson et al. .................. | 371/1 |
| 5,406,198 | 4/1995 | Orihashi et al. ................. | 324/158.1 |
| 5,438,259 | 8/1995 | Orihashi et al. ................. | 324/158.1 |

OTHER PUBLICATIONS

Presentation slides, believed to be presented at 1995 ISSCC conference, entitled A 1.0 GB/Second SCI Link in 0.8u BiCMOS, by Delbert Cecchi, Marius Dina, and Curt Preuss, IBM Corporation, System Technology and Architecture Division, Rochester, MN.

*Synchronization Design for Digital Systems* by Teresa H. Meng. Copyright © 1991 by Kluwer Academic Pubishers.

Dissertation entitled "STARI: A Technique for High-Bandwidth Communication" by Mark Russell Greenstreet. This report was presented to the Faculty of Princeton University in Candidacy for the Degree of Doctor of Philosophy and recommended for acceptance by the Department of Computer Science. Research Report CS-TR-394-92, Jan. 1993.

Dissertation entitled "High Performance Programmable DSP Architectures" by Mordechay Toma Ilovich. Studies held at Electronics Research Laboratory, College of Engineering, University of California, Berkeley, CA 94720. Memorandum No. UCB/ERL M88/31, May 20, 1988.

(List continued on next page.)

Primary Examiner—Phung Chung
Attorney, Agent, or Firm—Howell & Haferkamp, L.C.

[57] ABSTRACT

A digital phase adjustment circuit adjusts the phase between cell signals and a start-of-cell marker. The circuit relies on a known data pattern in unassigned cell signals in order to determine the phase. During a learning mode, the circuit samples an unassigned cell signal several times during a selected cell time to determine the location of the known data pattern. If the data pattern is not at the sampled position, the circuit increments the cell time during which it samples the next unassigned cell signal by one period, and decreases an amount of delay the circuit provides to a selected sample signal by one clock period. In this manner, the circuit can compensate for up to about two periods of delay before sampling the known data pattern. Thereafter, the circuit enters a tracking mode, and tracks phase variations between the cell signals and the start-of-cell marker. Additionally, the circuit selects a sample output signal which replicates the cell signals but is not subject to metastability. The skewed clocks are generated from a delay line having a number of variable delay elements. A circuit determines how many delay elements are needed to delay an input clock by one period, and then multiplies that number by one-third and two-thirds to determine the number of delay elements needed to create the skewed clocks. Alternatively, a circuit determines whether the delay provided by the delay line exceeds the input clock period, and selects a plurality of taps to output the skewed clocks.

31 Claims, 10 Drawing Sheets

OTHER PUBLICATIONS

Dissertation entitled "A High–Speed Asynchronous Communication Technique for MOS Systems" by Paul D. Bassett. This report was submitted in partial fulfillment of the requirements for the degrees of Master of Science and Electrical Engineer in Electrical Engineering and Computer Science at the Massachusetts Institute of Technology. May 1985.

*Computer* magazine article entitled "The Monarch Parallel Processor Hardware Design" by Randall D. Rettberg, William R. Crowther, Philip P. Carvey, and Raymond S. Tomlinson, BBN Systems and Technologies Corporation, pp. 18–30. Apr. 1990.

A copy of Professor Jonathon S. Turner's class notes, Washington University, St. Louis, Missouri (Course No. CS577, 1992–93 school year).

Excerpts from *1983 IEEE International Solid–State Circuits Conference* entitled "Session VII: Circuits For Digital Communications", WAM 7.1: A Single Chip NMOS Ethernet Controller by Allen G. Bell, Gaetano Borriello, Xerox Research Center, Palo Alto, California, pp. 70–71.

*IEEE Journal Of Solid–State Circuits* article entitled "A 45–Mbit/s CMOS VLSI Digital Phase Aligner" by Robert R. Cordell, vol. 23, No. 2, Apr. 1988, pp. 323–328.

*Proceedings Of The IEEE* article entitled "A Survey of Digital Phase–Locked Loops" by William C. Lindsey and Chak Ming Chie, vol. 69, No. 4, Apr. 1981, pp. 410–431.

*IEEE Journal Of Solid–State Circuits* article entitled "A 30–MHz Hybrid Analog/Digital Clock Recovery Circuit in 2–μm CMOS" by Beomsup Kim, David N. Helman and Paul R. Gray, vol. 25, No. 6, Dec. 1990, pp. 1385–1394.

1994 *IEEE International Solid–State Circuits Conference* article entitled "TA 6.3: A 125Mbs CMOS All–Digital Data Transceiver Using Synchronous Uniform Sampling" by Bin Guo, Arthur Hsu, Yun–che Wang, and James Kubinec, ISSCC94/Session 6/Clock And Data Recovery/Paper TA 6.2, pp. 112–113.

"Dynamic Delay Adjustment: A Technique for High–Speed Asynchronous Communication" by Paul D. Bassett, Lance A. Glasser, and Randy D. Rettberg, 1986, pp. 219–230.

*IEEE Journal Of Solid–State Circuits* article entitled "A 140 Mbit/s CMOS LSI Framer Chip for a Broad–Band ISDN Local Access System" by H. Jonathan Chao, Thomas J. Robe, Lanny S. Smoot, vol. 23, No. 1, Feb. 1988, pp. 133–141.

*IEEE Journal Of Solid–State Circuits* article entitled "A Si Bipolar 5–Gb/s 8:1 Multiplexer and 4.2–Gb/s 1:8 Demultiplexer" by M. Ohuchi, T. Okamura, A. Sawairi, F. Kuniba, K. Matsumoto, T. Tashiro, S. Hatakeyama, and K. Okuyama, vol. 27, No. 4, Apr. 1992, pp. 664–667.

1991 IEEE International Solid–State Circuits Conference article entitled "A 180MHz ASIC for High–Speed Interfaces" by D.W. Thompson, T.J. Gabara, and C.D. Stroud, Feb. 14, 1991.

DIGITAL PHASE ADJUSTMENT CIRCUIT FOR ASYNCHRONOUS TRANSFER MODE AND LIKE DATA FORMATS

This invention was made with government support under contract number DABT-63-93-C-0057 awarded by the Advanced Research Projects Agency. The government has certain rights in the invention.

BACKGROUND OF THE INVENTION

A significant and sometimes overriding problem for electronic systems which rapidly transmit data between Integrated Circuit (IC) packages is determining, at the receiver, when to sample the interconnecting wires to read and record the transmitted data values. Traditionally, the sampling time is established by a clock signal that is distributed to all of the IC packages. However, as data transmission rates increase, it becomes more difficult to control the phase between the data and clock signals due to variations in temperature, supply voltage, and signal path lengths. Similarly, in ATM and ATM-like systems that utilize a start-of-cell marker to indicate the arrival of the first word of a cell, it is difficult to control the phase between the arrival of the first word and the start-of-cell marker.

Some efforts have been made to adjust the phase between data and clock signals, like those disclosed in U.S. Pat. No. 4,700,347. A circuit is described therein which essentially samples a data signal four times during each clock period, determines the time interval during which a transition occurs in the data signal, and selects a sample signal whose timing is spaced from transitions in the data signal. However, the circuit can only adjust for up to one clock period of phase between the data signal and the clock, and the selection of a sample signal must be repeated several clock periods and averaged before the circuit can respond. Additionally, the circuit is fairly complex, and performs adjustments during the transmission of the data signals which can result in lost or repeated data.

Additional efforts are disclosed in *A 45-Mbit/s CMOS VLSI Digital Phase Aligner*, IEEE Journal of Solid-State Circuits, Vol. 23, No. 2, April 1988. In the circuit disclosed therein, phase adjustments between data and clock signals are made in half period increments, again, with a fair amount of circuit complexity, and only after repeated determinations that an adjustment should be made.

What is needed is a circuit which can adjust the phase between ATM or ATM-like cell signals and a start-of-cell marker. The circuit must be of minimum complexity, and capable of adjusting and tracking phase variations which cover several clock periods. Moreover, the circuit should execute an adjustment often enough to correct for phase variations in order to maximize bandwidth and minimize complexity, with adjustments being made in a manner such that data is neither lost nor repeated.

SUMMARY OF THE INVENTION

The present invention, a high-speed digital phase adjustment circuit, meets these needs by taking advantage of the structure of ATM and ATM-like data formats in a way that significantly extends the rate at which cells can be transmitted, both between and, for large circuits, inside IC packages. The invention exploits the fact that it is not possible to operate an ATM switch with any link fully loaded because switch path contention will cause the switch to fail. For this reason, unassigned cells are occasionally transmitted when there are no assigned cells to transmit. The switch circuitry can be designed so that the unassigned cells contain a known data pattern, thereby providing a marker to be used by the circuit of the present invention to monitor and adjust, as needed, the phase between cell signals and a start-of-cell marker. The invention can be optimized for local regions where it is reasonable to limit the worst case phase shift between cell signals and a start-of-cell marker to several clock periods.

The digital phase adjustment circuit operates in a learning mode and a tracking mode. During the learning mode, the circuit samples each unassigned cell signal during a particular cell time in search of the marker. The start-of-cell marker is used to generate signals indicative of the cell times. If the marker is not in the position sampled by the circuit, the circuit increments the cell time during which the next unassigned cell signal will be sampled by one period, and decreases an amount of delay provided by the phase adjustment circuit by one period.

During the next unassigned cell signal, if the circuit samples and finds the marker, the circuit enters the tracking mode. If not, the circuit again increments the cell time for the next unassigned cell signal and decreases the delay provided by the circuit. Because the circuit is designed to compensate for a maximum phase difference between cell signals and the start-of-cell marker on the order of two clock periods, the circuit will sample the marker during the next unassigned cell signal, and thereafter operate in the tracking mode. In the tracking mode, the circuit may adjust the cell times and delays in order to track phase variations between the cell signals and the start-of-cell marker as a result of temperature and supply voltage variations.

The digital phase adjustment circuit can be divided into two portions; a data handling circuit and a control circuit. A data handling circuit is provided for each cell signal input in a set of inputs. A set of inputs is comprised of all the inputs whose signals can be considered to have the same phase relationship. Only one control circuit is needed for each set of inputs.

The data handling circuit samples each bit of the cell signals with three skewed clocks during each period of the local clock to create three sample signals. Although each of the sample signals have a different phase relationship with the cell signals, at least two of the sample signals replicate the data patterns of the cell signals. During the transmission of an unassigned cell signal, the data handling circuit uses logic gating to select one of the sample signals that has its data transition at least a minimum skew time away from data transitions in the cell signals. In this manner, the selected sample signal is not subject to metastability which would be caused by the cell signal being sampled at its data transition times. The maximum phase variation between cell signals and the start-of-cell marker during the time between any two unassigned cell signals is required to be limited to less than the predetermined minimum skew time. Therefore, the phase cannot vary to the point that the selected sample signal is in phase with the cell signals before the arrival of the next unassigned cell. At that time, a different sample signal will be selected, if necessary, that is also at least a minimum skew time away from data transitions in the cell signals. Thusly, the cell signals are continuously sampled and phase adjusted at each unassigned cell.

The data handling circuit also provides delay to the selected sample signal according to the phase between the unassigned cell signal and the start-of-cell marker. The greater the phase, the lesser the amount of delay provided by the circuit. In this manner, for any given cell signal applied to any given data handling circuit, the sum of its phase and the delay provided by the circuit of the preferred embodiment is approximately two clock periods. The selection of one of the sample signals and the amount of delay provided to the selected sample signal are controlled by sample select and delay select signals that are generated by the control circuit.

The control circuit samples the sample signals of the data handling circuit to create three control signals. This sampling occurs during an unassigned cell time when the sample signals are expected to represent the known data pattern in the unassigned cell signal. If the control circuit determines that the phase between the unassigned cell signal and the start-of-cell marker is greater than some fraction of a clock period, then the control circuit will reduce the amount of delay provided to the selected sample signal by one clock period. However, if a control circuit for a separate digital phase adjustment circuit determines that the phase between its unassigned cell signal and the start-of-cell marker is greater than one and some fraction of a clock period, then it will reduce the amount of delay provided to its selected sample signal by about two clock periods. In this manner, the amount of delay provided by one digital phase adjustment circuit may vary from that provided by another so that all the circuits output the selected sample signals in phase.

Once the control circuit determines the initial phase between the cell signals and the start-of-cell marker, it can adjust the selection of the sample signal and the amount of delay provided to the selected sample signal to adjust for drifts as a result of temperature and voltage variations. As long as the maximum phase drift between unassigned cell signals does not exceed the minimum skew time between the three skewed clocks of the data handling circuit, the control circuit will track the cell signals, even if the phase drift covers several clock periods.

Because the control circuit only adjusts the selection of the sample signal and the amount of delay provided to the selected sample signal when the cell signals are unassigned, the integrity of actual data cells is maintained in addition to the phase, and with a minimum of circuit complexity. Using 0.8 micron technology, 200 gates can be fit in the chip area required by a wire bond pad. Under good conditions, the digital phase adjustment circuit will only require the area of about 95 gates, or about one half the area of a pad. Under lesser conditions, the circuit will still only require the area of about 210 gates, or about the area of a pad.

A circuit is also disclosed for generating the skewed clocks required by the data handling circuit. A delay line is constructed from a number of variable delay elements, such as inverters, and a circuit determines the number of delay elements needed to delay an input clock by one period. This number can then be multiplied by some fraction to determine the number of delay elements needed to delay the input clock by the fraction of the clock period. Alternatively, the circuit can determine whether the delay provided by the delay line exceeds the input clock period, and then, based on that determination, select a plurality of taps to output the skewed clocks. If the delay line is designed for a given clock speed, then the skew times between the clocks will be at least as large as the minimum skew times for the data handling circuit, regardless of variations in the delay elements.

While the principal advantages and features of the invention have been described above, a more thorough understanding may be attained by reference to the drawings and detailed description which follow.

DETAILED DESCRIPTION OF THE PREFERRED EMBODIMENTS

Figure 1:
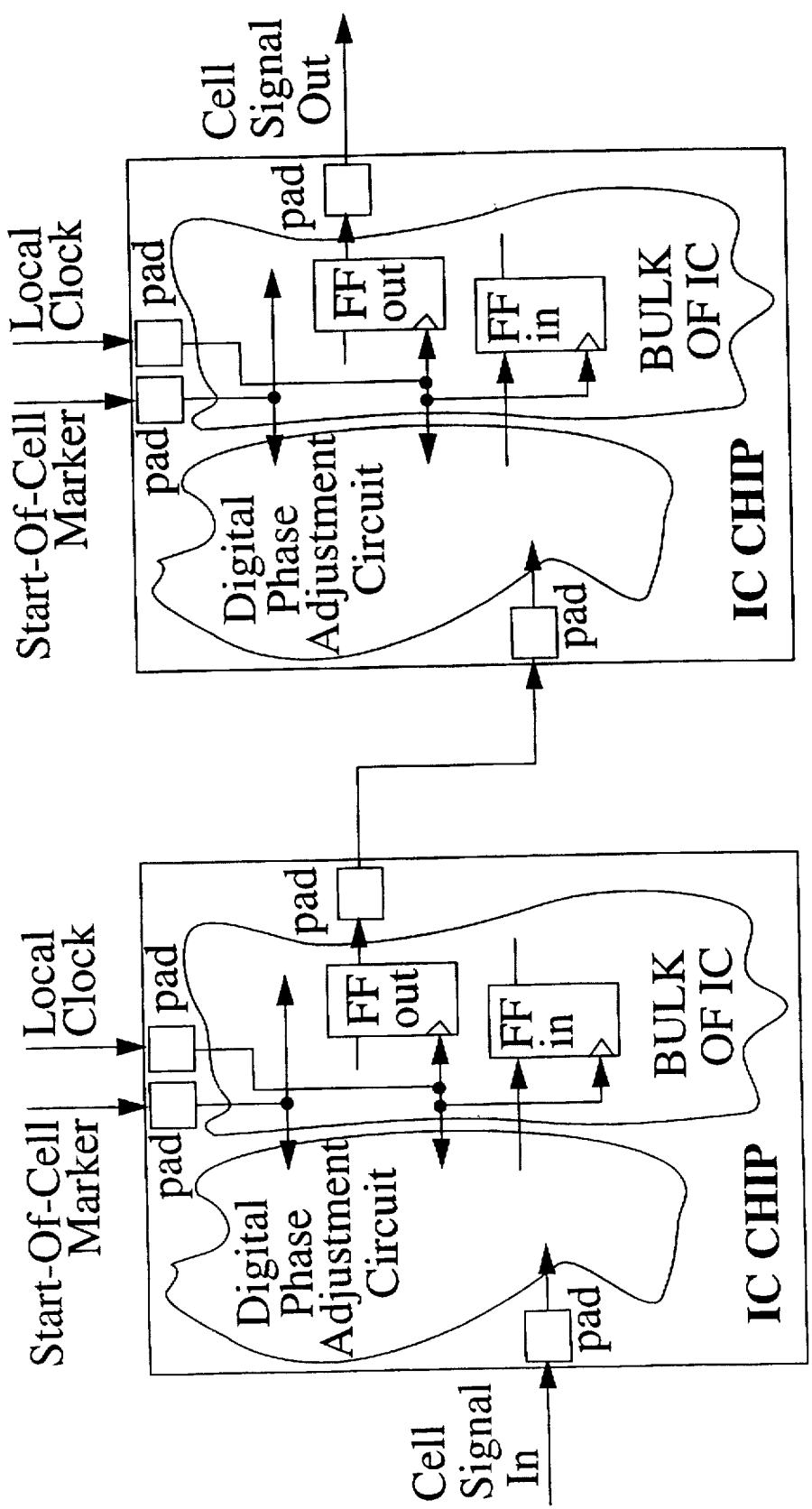
FIGS. 1A and 1B illustrate a block diagram of a simple implementation of digital phase adjustment circuits.

Digital phase adjustment circuits adjust the phase between incoming cell signals and a start-of-cell marker. As shown in FIGS. 1A and 1B, each IC chip receives a start-of-cell marker to indicate when the "Bulk of IC" circuitry should expect the beginning of a new cell signal. A cell signal is a signal representing one bit stream in an ATM or ATM-like data cell. The start-of-cell marker is a signal having the same period as the ATM or ATM-like cell signal, and having a single pulse that is asserted, or high, during the clock period that the bulk of IC circuitry is supposed to receive the first bit of the cell signal.

Due to variations in the phase between the start-of-cell marker and cell signals, the first bit of a cell signal might not arrive at the bulk of IC circuitry while the start-of-cell marker is high. For this reason, a digital phase adjustment circuit is provided to adjust the phase between the marker and the cell signals, thereby ensuring that the first bit of each cell signal is delivered to the bulk of IC circuitry while the start-of-cell marker is high. Just after a system wide reset, which includes the time just after power is applied, the arrival of the first bit of a cell signal may be in synchronization with the start-of-cell marker, or may be delayed by one or more clock periods. During this time, the digital phase adjustment circuit is operating in a learning mode of operation, and adjusts the phase until the first bit of a cell signal is synchronized with the start-of-cell marker. Thereafter, the phase adjustment circuit operates in a tracking mode, and adjusts for positive and negative phase variations between the start-of-cell marker and subsequent cell signals as a result of temperature and voltage variations.

As described below, the start-of-cell marker, which indicates the timing for the first bit in a cell signal, is also used to generate cell time signals which indicate the timing of subsequent bits. Because each positive transition in the clock signal defines the timing, or beginning, of a data bit, transitions in the start-of-cell marker and the cell time signals must be in phase with positive transitions in the clock signal to accurately define the timing of the data bits. For this reason, the start-of-cell marker may need to be periodically re-clocked by the clock signal as these signals are distributed.

Each digital phase adjustment circuit has a corresponding "set of inputs". All of the cell signals applied to any single set of inputs must be in phase. In other words, they must originate from the same IC package, or from the same part of the IC chip that contains the phase adjustment circuit, and be carefully routed together to the inputs of the phase adjustment circuit. This definition implies care in the design of the output stages of the sending IC packages so that all of the output signals switch at the same time. Typically, a flip-flop is placed near each output pad, and the clock lines to all the flip-flops are such that there is little phase difference between the flip-flop clock inputs.

FIGS. 1A and 1B illustrate a simple implementation of digital phase adjustment circuits where each IC chip has only one cell signal input, one cell signal output, and one phase adjustment circuit. Although a set of inputs can be as small as a single input as shown, in a typical application, most sets comprise more than one. Moreover, several phase adjustment circuits can be used on each IC chip to adjust the phase of several sets of inputs before passing the signals to the bulk of IC circuitry.

The incoming cell signals, after being conditioned by a phase adjustment circuit, must be latched by a local clock into a flip-flop FF-in before the cell signals can be processed by the bulk of IC circuitry. This conditioning and latching implies an input delay of several clock periods to the bulk of IC circuitry. The timing of the start-of-cell marker must account for this delay. For ATM data formats, where each external cell signal is fifty-three clock periods in length, this delay is acceptable because the bulk of IC circuitry will still have tens of clock periods to create and send cell level hand-shake (flow control) signals to other IC packages. For ATM-like data formats, where the minimum length of the external cell signal can be as small as approximately eight or nine clock periods and still be compatible with the phase adjustment circuit described herein, the bulk of IC circuitry may have substantially less time to create and send the hand-shake signals.

Due to the long propagation delay of pad driver-receiver pairs, pad circuit designs having a large gain-bandwidth product may be utilized so it is possible to have several data values propagating along the wire between the transmitter and the receiver at the same time.

The digital phase adjustment circuit of the preferred embodiment is designed to compensate for a maximum phase between cell signals and the start-of-cell marker on the order of seven hundred degrees, or about two clock periods. In a typical application where several phase adjustment circuits are used for each IC chip, the first bit of all the incoming cell signals, regardless of their source, must pass from the phase adjustment circuits to the bulk of IC circuitry while the start-of-cell marker is high. To accomplish this, and as explained in greater detail below, some of the phase adjustment circuits delay the cell signals one or more clock periods while others do not. The greater the phase between the start-of-cell marker and a cell signal, the lesser the amount of delay provided to the cell signal by a phase adjustment circuit. In this manner, for any given cell signal, the sum of its phase relative to the start-of-cell marker and the delay provided by a digital phase adjustment circuit is approximately two clock periods.

The digital phase adjustment circuit can be divided into two smaller circuits to facilitate a description of its operation; a data handling circuit and a control circuit. Although each cell signal input in a given set of inputs requires its own data handling circuit, only one control circuit is needed for each set of inputs. Additionally, it is the control circuit that operates in the learning and tracking modes mentioned above.

Figure 2:
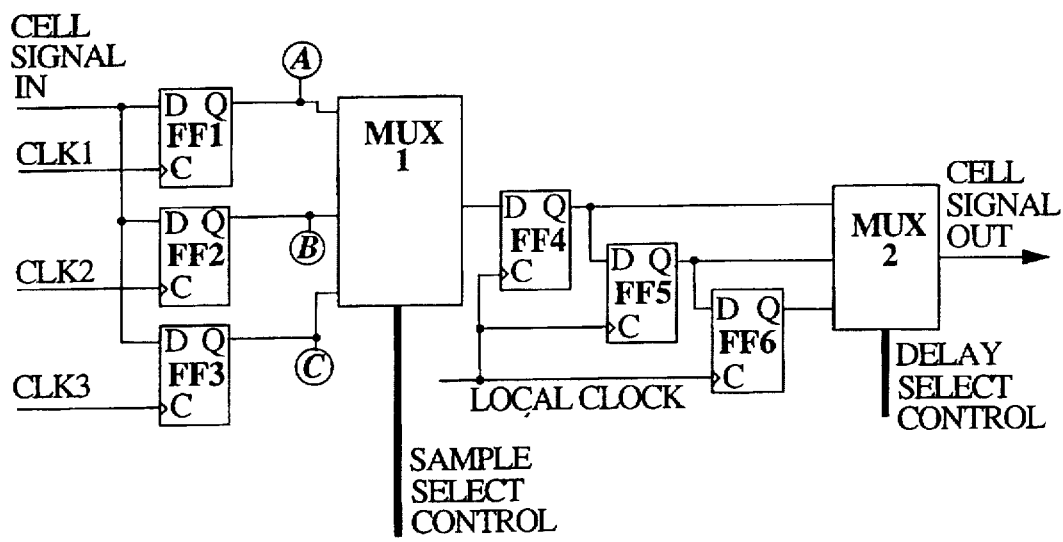
FIG. 2 shows the key logic components of a data handling circuit.
Figure 3:
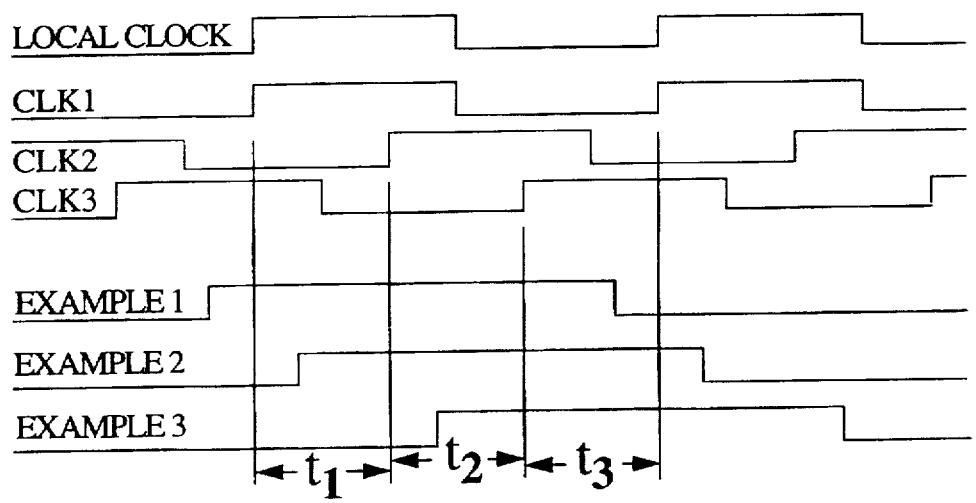
FIG. 3 is a timing diagram of skewed clocks and example cell signals.

FIG. 2 shows the key logic components of the data handling circuit. The circuit utilizes three clocks, Clk1, Clk2 and Clk3, which, as illustrated in FIG. 3, have a global clock period and are skewed so that a positive transition in one clock is separated from positive transitions in the other clocks by at least some fraction of a clock period. The skew time between the positive transition in Clk1 and the positive transition in Clk2 is defined as $t_1$. The skew time between Clk2 and Clk3 is $t_2$, and the skew time between Clk3 and Clk1 is $t_3$. The sum of skew times $t_1$, $t_2$ and $t_3$ is equal to the global clock period.

Referring again to FIG. 2, skewed clocks Clk1, Clk2 and Clk3 are provided to the clock inputs of D flip-flops FF1, FF2 and FF3, respectively. Each bit of every cell signal applied to the input of the data handling circuit is sampled by flip-flops FF1, FF2 and FF3 upon the positive transitions of their corresponding clocks. As a result, three sample data signals "A", "B" and "C" are created. Although the sample signals "A", "B" and "C" are out of phase relative to one another, each sample signal should replicate the data pattern of the cell signals, provided that none of the skewed clocks are in phase with data transitions in the cell signals.

Sampling a cell signal during a data transition can result in metastability, the timing condition where capture of the cell signal data value is unreliable. But if the cell signal is sampled at the three different clock times while the cell signal represents a known data pattern, then a multiplexer MUX1, shown in FIG. 2, can select a sample signal that is created at least the smallest of skew times $t_1$, $t_2$, and $t_3$ away from data transitions in the cell signal, as explained more fully below.

The known data pattern mentioned above is contained in each unassigned cell signal that is transmitted throughout an ATM switch when there are no assigned cell signals to transmit. It is not possible to operate an ATM switch with any link fully loaded because switch path contention will cause the switch to fail, i.e. have cell loss. Additionally, the switch circuitry for the preferred embodiment is designed so that unassigned cells are consecutively transmitted during the latter portion of the reset period. During that time, the control circuit is operating in the learning mode, and can adjust for initial delays before the arrival of assigned cell signals.

A circuit constraint for the preferred embodiment is that during the time between the arrival of two unassigned cell signals to the cell signal input of the data handling circuit, the amount of phase variation between the start-of-cell marker and the cell signals must be less than the smallest of skew times $t_1$, $t_2$ and $t_3$. If this is so, the sample signal selected by MUX1 is not subject to metastability. This is because at the time it is selected, the phase between the selected sample signal and the cell signal is greater than the amount of phase by which the cell signals can drift before the arrival of the next unassigned cell signal. Hence, even if the cell signals drift in phase to their maximum extent, they will not drift to the point that the selected sample signal is created during a data transition in a cell signal. Upon the arrival of the next unassigned cell signal, MUX1 will again select a sample signal that is created at least the smallest of skew times $t_1$, $t_2$, and $t_3$ away from data transitions in the cell signal.

The selection by MUX1 of a sample signal will be explained with reference to the timing diagrams of FIG. 3.

For illustrative purposes, Clk1, Clk2 and Clk3 are skewed so that a positive transition in one clock is separated from positive transitions in the other clocks by one third of a clock period. Specific lower limits for skew times $t_1$, $t_2$ and $t_3$ are explained below.

If the cell signal is an unassigned cell signal, and it is known that there is a data transition during a particular clock period, then the following rules can be applied to select the sample signal that is created at least one third of a clock period away from the data transition in the cell signal: if "A", "B" and "C" are all high (Example 1), select sample signal "B"; if "A" is a different value than "B" and "C" (Example 2), select sample signal "C"; and if "C" is a different value than "A" and "B" (Example 3), select sample signal "A". As explained below, the control circuit generates sample select signals to control the selection of a sample signal by MUX1.

If all three sample signals are high, then the cell signal must have changed states between Clk3 and Clk1, as shown in FIG. 3, Example 1. Thus, sample signal "B" must have been created at least one third of a clock period away from the time the cell signal changed state. Likewise, the other two rules ensure that the selected sample signal is created at least one third of a clock period away from the timing that causes metastability.

Consider the case where the cell signal changes state at the same time as a positive transition in one of the skewed clocks, such as Clk3. Then the data value recorded for sample signal "C" may be high or low. If "C" is recorded as the same value as "A" and "B", then sample signal "B" will be selected, which was created exactly one third of a clock period before the metastable timing. On the other hand, if "C" is recorded as a value different from "A" and "B", then sample signal "A" will be selected, which was created exactly two thirds of a clock period before the metastable timing, and will have another bit created exactly one third of a clock period after the metastable timing. Thus, regardless of the value recorded for "C", a sample signal that is created at least one third of a clock period away from the metastable timing is still selected.

It is possible to design the data handling circuit to sample a cell signal more than three times during one period of the local clock. However, sampling the cell signal only three times per clock period to create three sample signals maximizes the separation between the creation of the selected sample signal and a data transition in the cell signal, while minimizing the circuit complexity. Moreover, the above described separation is reliably achieved, regardless of whether one of the sample signals is driven metastable.

As explained in greater detail below, the control circuit is responsive to the sample signals "A", "B" and "C", and provides a delay select signal to multiplexer MUX2, shown in FIG. 2, to control the amount of delay that is provided to the selected sample signal by the latter portion of the data handling circuit. Note that flip-flops FF4, FF5 and FF6 are connected such that the output of FF6 represents the output of FF5 delayed by one clock period, the output of FF5 represents the output of FF4 delayed by one clock period, and the output of FF4 represents the sample signal selected by MUX1.

Initially, when the control circuit begins the learning mode of operation, the output of FF6 is selected. If the control circuit determines that the cell signals are delayed by more than some fraction of a clock period relative to the start-of-cell marker, MUX2 will select the output of FF5, thereby decreasing the amount of delay provided to the selected sample signal by one clock period. If the control circuit then determines that the cell signals are still delayed by more than some fraction of a clock period, MUX2 will select the output of FF4. In this manner, about two clock periods of delay in the cell signals can be recovered by the phase adjustment circuit during the learning mode. Thereafter, the control circuit enters a tracking mode and adjusts the selection of MUX2 to track phase variations between the cell signals and the start-of-cell marker as a result of temperature and supply voltage variations. A complete description of the control circuit and the manner in which it controls the data handling circuit is provided below.

Figure 4:
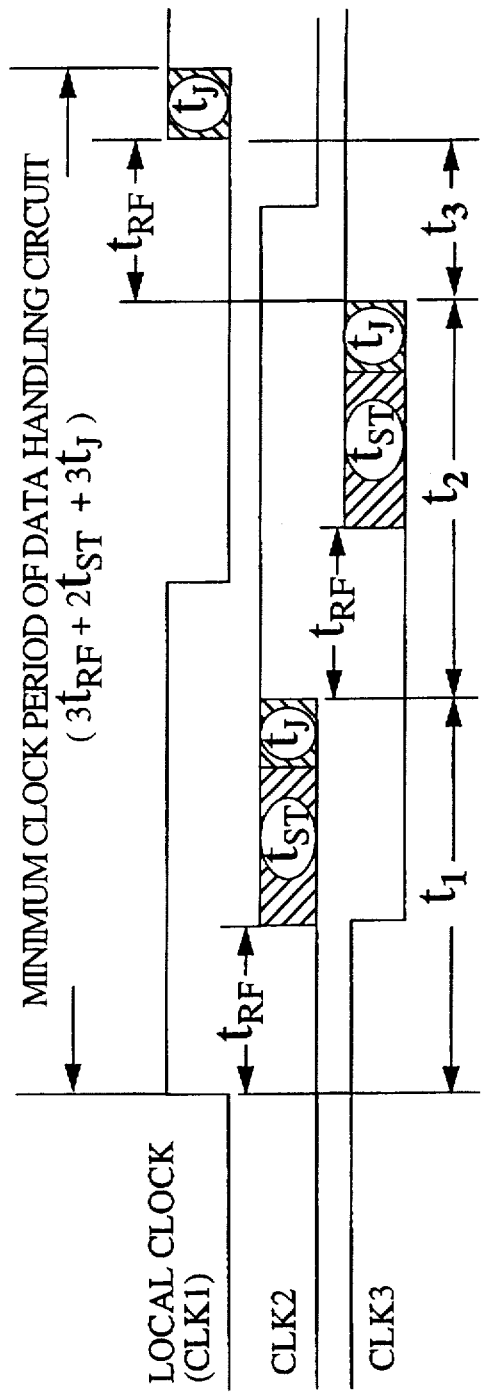
FIG. 4 is a timing diagram of the minimum skew times and clock period for the data handling circuit.

FIG. 4 illustrates the limits to setting the minimum clock period for the data handling circuit. The skew times $t_1$, $t_2$ and $t_3$ must be large enough to allow the circuit to cleanly capture data transitions. Skew times $t_1$ and $t_2$ can be no smaller than the sum of: the clock jitter, $t_J$; the timing difference between data rising and falling transitions for a cell signal, $t_{RF}$; and the tolerance of setting the clocking time interval, $t_{ST}$. Skew time $t_3$ can be no smaller than the sum of $t_J$ and $t_{RF}$.

However, there is an additional limit to skew time $t_3$ for the data handling circuit shown in FIG. 2. Skew time $t_3$, the time between positive transitions in Clk3 and Clk1, must be long enough to allow the sample value recorded as "C" to pass through FF3 and MUX1, and then meet the set-up requirements of FF4.

Using a 0.8 micron CMOS process and assuming a value of one fourth of a nanosecond for $t_J$, and one half of a nanosecond for $t_{RF}$ and $t_{ST}$, the minimum skew time for $t_1$ and $t_2$ is 1.25 ns. Assuming a value of approximately one nanosecond each for the propagation delays of FF3 and MUX1 and the set-up time of FF4, the minimum skew time for $t_3$ is three nanoseconds. Thus, the minimum clock period for the data handling circuit of FIG. 2 is approximately 5.5 ns, and hence, the maximum clock frequency is about 180 MHz.

Figure 5:
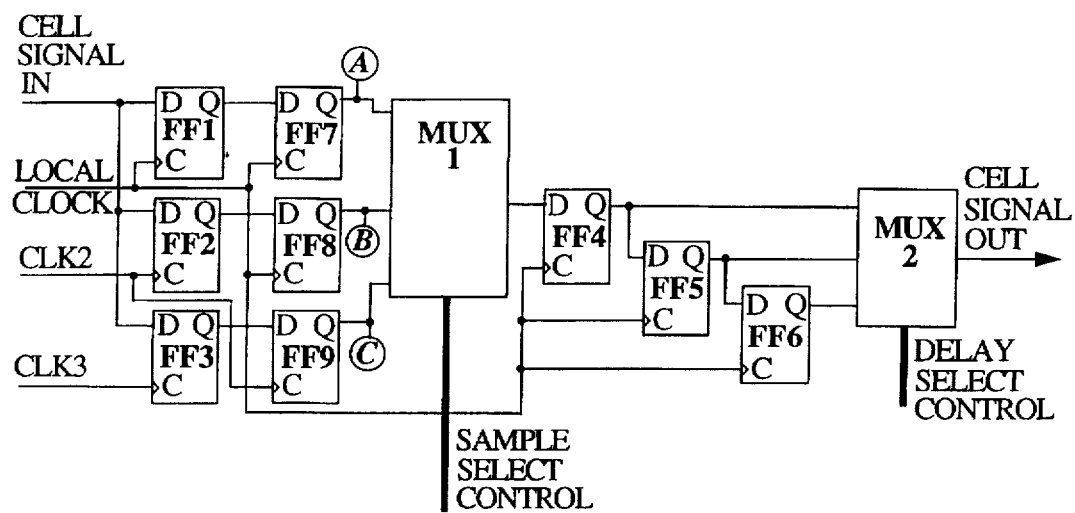
FIG. 5 shows a data handling circuit with tighter reclocking of sample signals.

There is a simple change to the data handling circuit of FIG. 2, shown in FIG. 5, that will reduce the minimum clock period and, hence, increase the maximum clock frequency. A second rank of D flip-flops FF7, FF8 and FF9 are added to provide tighter reclocking of the sample signals "A", "B" and "C" that are created at the outputs of the first rank of flip-flops, FF1–FF3. Note that FF9 samples the output of FF3 upon a positive transition in Clk2. As a result, the additional limit for the circuit of FIG. 5 is that the timing between the rising edges of Clk2 and Clk1 (the sum of $t_2$ and $t_3$) must be long enough to allow the reclocked data value "C" to pass through FF9 and MUX1, and then meet the set-up requirements of FF4. Thus, the minimum clock period for the circuit of FIG. 5 is about 4.25 ns, and hence, the maximum clock frequency is about 235 Mhz.

In fact, with a third rank of flip-flops, all three clocked with the local clock, and careful attention to the clock distribution circuits to reduce jitter, a clock frequency of 300 Mhz is possible. However, for the preferred embodiment, the further increase in clock speed would be offset by the additional circuit complexity.

FIG. 5 is a complete data handling circuit for a cell signal input. Assuming a D flip-flop equals eight equivalent gate areas, and a three input multiplexer equals four equivalent gate areas, the total area of the circuit in FIG. 5 is eighty equivalent gate areas.

Figure 6:
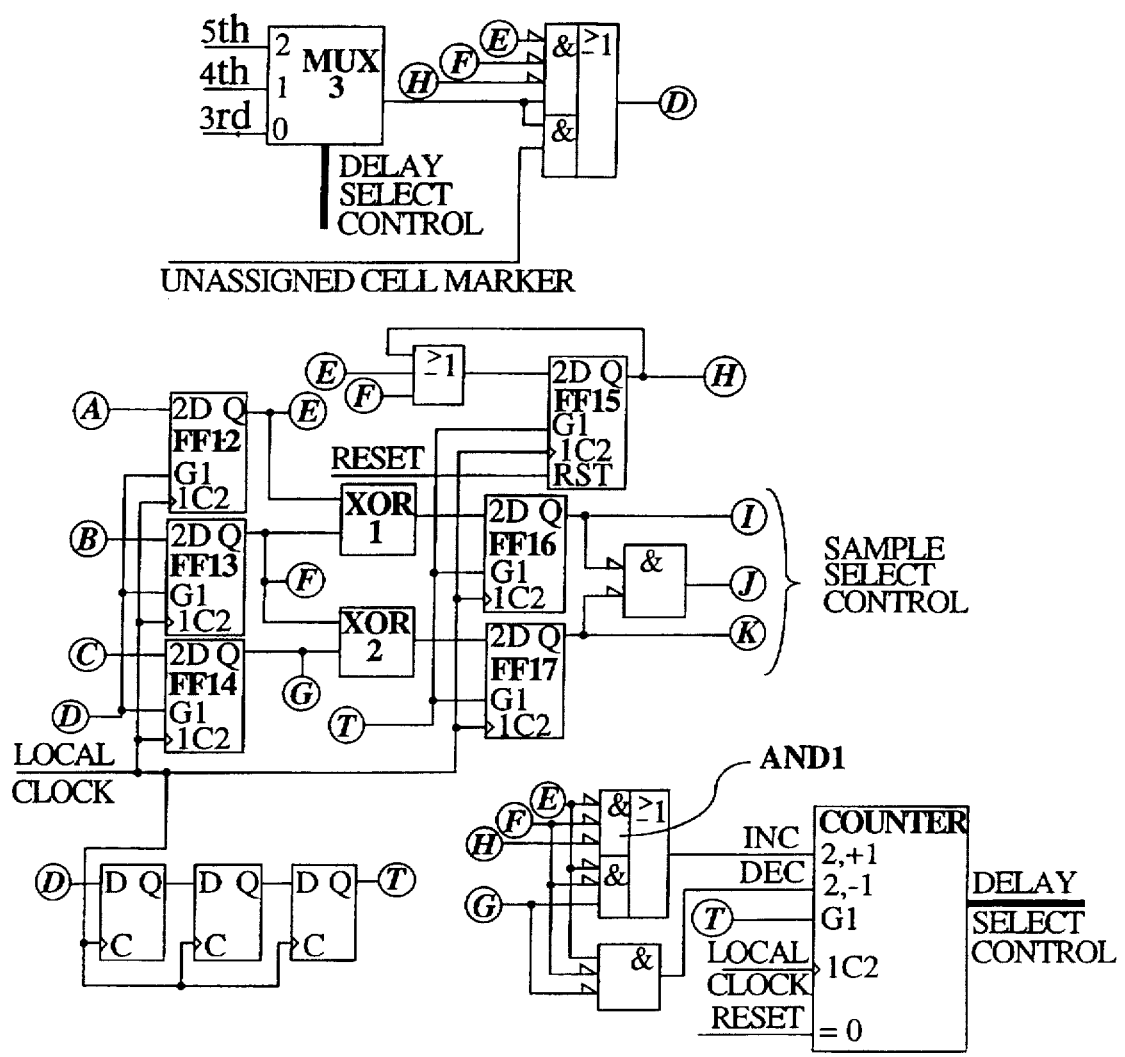
FIG. 6 shows a circuit for controlling the data handling circuit.

The control circuit for the digital phase adjustment circuit is shown in FIG. 6. Using scaling similar to that used for FIG. 5, the circuit of FIG. 6 contains about 130 equivalent gate areas. Thus, even if a control circuit is required for each cell signal input, the size of each digital phase adjustment circuit is only about 210 equivalent gate areas, which is still very close to the size of an input pad. If one control circuit can be shared among eight cell signal inputs, then the area required for each cell signal input is about 95 equivalent gate areas, or one half the area of a pad. A circuit is also needed to generate cell time signals "3rd", "4th" and "5th", which represent the timing for the arrival of the 3rd, 4th, and 5th bits of a cell signal at the bulk of IC circuitry, as well as a circuit to create skewed clocks Clk1, Clk2 and Clk3. However, the area required for these circuits can be amortized over all of the cell signal inputs and does not contribute significantly to the area required by the digital phase adjustment circuit on an IC chip.

The external cell format of the preferred embodiment is fifty-three words long with the unassigned cell containing: the five bytes of an unassigned cell header; a 00, 00, and FF hex pattern as the next three bytes; and the remaining forty-five bytes which can be any value. Other unassigned cell formats can be used, as can other external or internal cell format lengths, with suitable adjustment to the unassigned cell format and the cell time signals provided to the MUX3 inputs, as shown in FIG. 6.

As explained below, the control circuit shown in FIG. 6 can determine whether a cell signal provided to the input of a data handling circuit is an unassigned cell signal. During each unassigned cell signal, the control circuit generates a gating signal "D" which is provided to the gate inputs of flip-flops FF12, FF13 and FF14. Sample signals "A", "B" and "C" are provided to the data inputs of flip-flops FF12, FF13 and FF14, respectively. Control signals "E", "F" and "G" are created upon a positive transition in the local clock when "D" is asserted. The assertion of gating signal "D" is controlled by the cell time signals provided to the MUX3 inputs, and corresponds to the time during which sample signals "A", "B" and "C" should represent the value of the eighth bit of the unassigned cell signal.

The manner in which cell time signals "3rd", "4th" and "5th" are utilized by the control circuit to capture the value of the eighth bit of an unassigned cell signal will be explained with reference to the digital phase adjustment circuit shown in FIG. 7, which is a complete circuit for a one cell signal input. Initially, MUX3 selects cell time signal "3rd" for generating gating signal "D". If the unassigned cell signal is in phase with the start-of-cell marker, then the seventh bit of the unassigned cell signal will be represented by sample signals "A", "B" and "C" when the third bit is at the input to the bulk of IC circuitry. Due to the gating through which the cell time signals must pass to generate gating signal "D", the gating signal is delayed enough to prohibit "D" from enabling FF12, FF13 and FF14 during the third cell time. As a result, "D" is delayed such that it enables FF12, FF13 and FF14 during the fourth cell time, which is the cell time during which the eighth bit of the unassigned cell signal is represented by the sample signals.

If the unassigned cell signal is not in phase with the start-of-cell marker, but instead is delayed by one clock period, then the eighth bit of the unassigned cell is represented by the sample signals during the fifth cell time. Recalling that sample signals "A", "B" and "C" are sampled by the control circuit one cell time later than the cell time signal selected by MUX3, MUX3 will select cell time signal "4th" so that FF12, FF13 and FF14 sample the sample signals during the fifth cell time. Note that the delay select control signal which controls the selection of MUX3 also controls the selection of MUX2, and hence the delay provided to the selected sample signal. When cell time signal "4th" is selected by MUX3, the output of FF5 is selected by MUX2. Thus, as stated above, the control circuit decreases the amount of delay provided to the selected sample signal by one clock period when the cell signal is delayed by one clock period.

Similarly, if the unassigned cell signal is delayed by two clock periods, and the eighth bit is represented by the sample signals during the sixth cell time, then MUX3 will select cell time signal "5th". At the same time, MUX2 will select the output of FF4 so that the amount of delay provided to the selected sample signal is decreased by another clock period.

A key to the operation of the control circuit of FIG. 6 is that flip-flops FF12, FF13 and FF14, which create control signals "E", "F" and "G", must be stable before the control signals are used. It does not matter if one of the flip-flops is driven metastable, provided that the control signals are interpreted the same by all of the circuitry dependent on their values. Note that although control signals "E", "F" and "G" are created by clock gating signal "D" at the fourth, fifth, and sixth cell times as explained above, the control signals are not used until "T" is asserted, which occurs several clock periods after "D". Thus, FF12, FF13 and FF14 are allowed to resolve for several clock periods. The number of clock periods between the assertion of "D" and the assertion of "T" can be adjusted so that the probability that FF12, FF13 or FF14 is still metastable when "T" is asserted is acceptably small.

Figure 7:
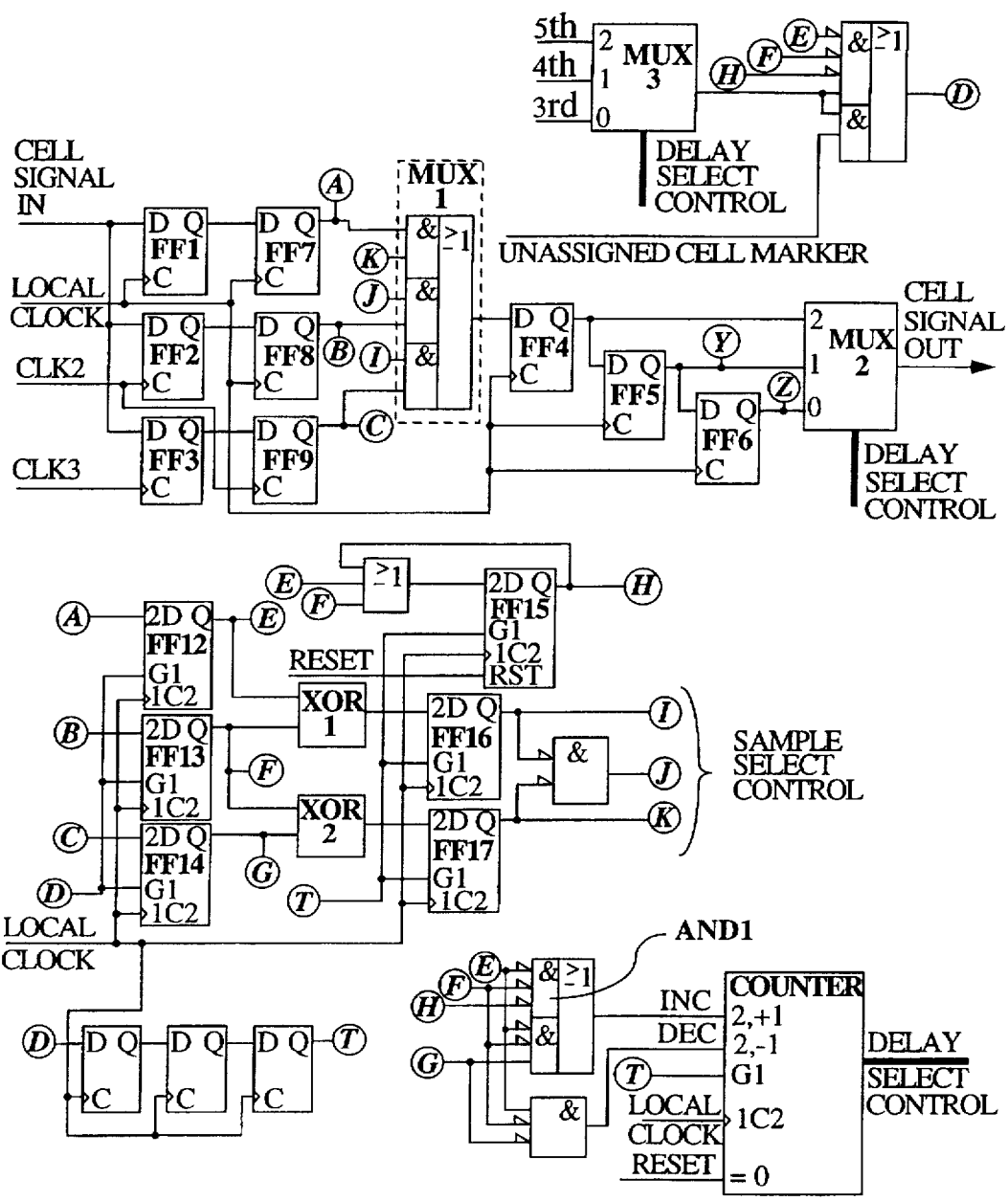
FIG. 7 shows a complete digital phase adjustment circuit for one cell signal input.

As shown in FIGS. 6 and 7, the control signals are used upon the assertion of "T" to generate sample select signals "I", "J" and "K". Control signals "E" and "F" are provided to the inputs of exclusive OR gate XOR1, and control signals "F" and "G" are provided to the inputs of XOR2. The outputs of XOR1 and XOR2 are provided to the data inputs of D flip-flops FF16 and FF17, respectively. The output of FF16 represents sample select signal "I", and the output of FF17 represents sample select signal "K". Sample select signals "I" and "K" are provided to the inputs of a nand gate, the output of which is sample select signal "J". Only one of the sample select signals can be asserted at any given time. An example of the operation of this sample select circuitry is provided below.

Regardless of the mode of operation of the control circuit, an indication is needed as to whether the cell signal provided to the cell signal input is unassigned so that clock gating signal "D" can be generated. During the tracking mode, the control circuit relies on an Unassigned Cell Marker which is created by the bulk of IC circuitry. The bulk of IC circuitry samples the first bit of the cell signal, the busy/idle bit, and provides the unassigned cell marker to the control circuit in time for the control circuit to generate gating signal "D", in the event that the cell signal is unassigned. At the lower limit, the bulk of IC circuitry will have less than a few clock periods to generate and deliver the marker to the control circuit.

During the learning mode, the control circuit cannot depend on the unassigned cell marker as reliable. Delay between the unassigned cell signals and the start-of-cell marker can result in the bulk of IC circuitry prematurely looking for the busy/idle bit. For this reason, the control circuit generates a mode signal "H" to indicate whether the circuit is in the learning mode. The flip-flop FF15 that generates mode signal "H" is cleared by the reset signal, and then set when either "E" or "F" first becomes a "1". Thus, so long as "E", "F" and "H" are "0", the control circuit is in the learning mode and "D" will be generated during the transmission of each unassigned cell signal.

Note that control signals "E" and "F" and mode signal "H" are provided to gating which controls the incrementing of the control circuit counter. Because of the system reset, "H" is still "0" at the counter input when "T" is first asserted, if after sampling the first unassigned cell signal, "E" and "F" are both "0", then the counter is incremented, which decreases the delay provided to the selected sample signal, and adjusts the cell time during which the next unassigned cell signal is sampled.

Once "E" or "F" becomes a "1", which represents capture of the eighth bit of the unassigned cell signal, the control circuit enters the tracking mode. If this occurs during the transmission of the second unassigned cell signal, the counter will not be incremented because "E" and/or "F" is a "1". Note that "H" is created upon the assertion of "T", which is when the counter effects the increment or decrement command. Thus, "H" will still be a "0" at the input to the increment gating until sometime after the second assertion of "T", at which time "H" will become a "1". As a "1", "H" will prevent AND1 of the counter increment logic from being asserted while the control circuit is in the tracking mode. Once in the tracking mode, the unassigned cell marker will reliably indicate the status of cell signals.

There are only six possible states of control signals "E", "F" and "G". Defining these states as a vector [E F G], the six possible vectors are: |100|, |110|, |111|, |011|, |001|, and |000|. It is possible, with metastability, that flip-flop FF4 of FIG. 5 will be set to a "1" while flip-flops FF12, FF13 and FF14 are all set to "0". The control circuit must not allow this condition to happen. Once the control circuit enters the tracking mode, the circuit depends on the control signal vector to contain at least one "1" in order to know what correction, if any, is needed to track the eighth bit in an unassigned cell signal. Remembering that the phase between the cell signals and the start-of-cell marker is a slowly varying function, the control circuit is designed such that the first time a |001| or |100| vector is captured, the control circuit will adjust the cell time during which the control signals are created for the next unassigned cell signal, which typically results in the subsequent capture of a |110| or |011|, respectively.

Figure 8:
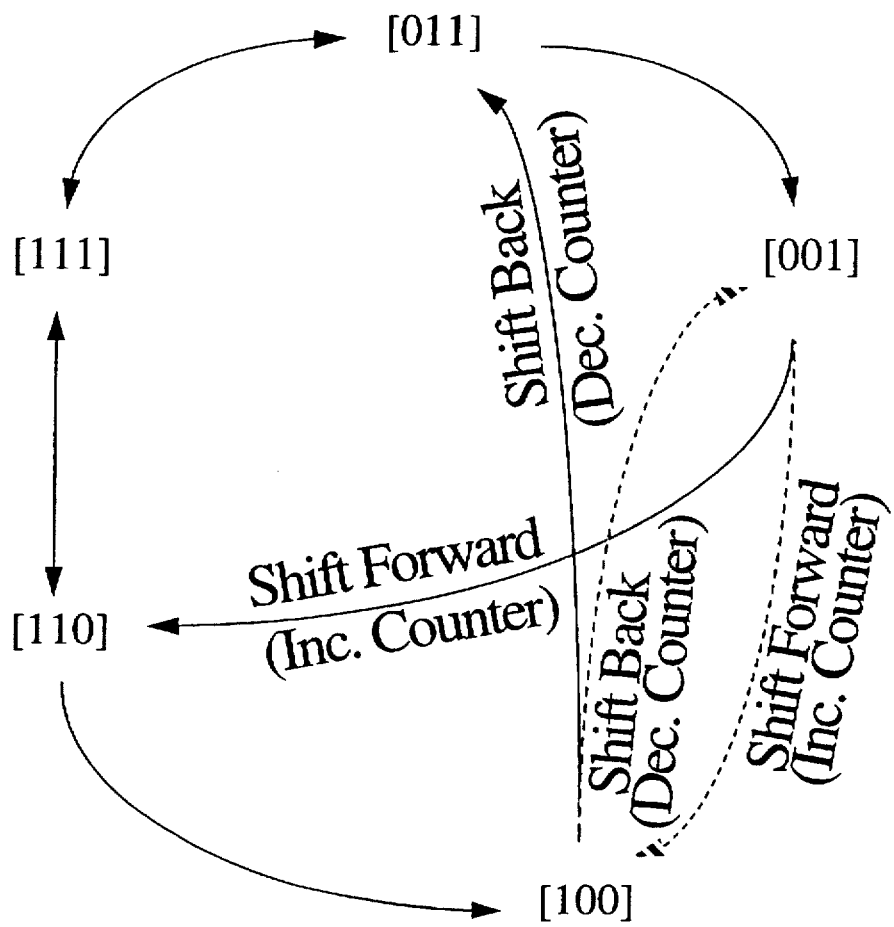
FIG. 8 is a state diagram of the control circuit of FIG. 6.

FIG. 8 is a diagram of the allowed state to state movement of the control signal vectors during the tracking mode. The slowness of the phase variation means that, at most, only one element in the control signal vector can change between any two unassigned cell signals. Thus, even if the control circuit does not adjust the cell time during which the control signals are created, |011| can change to |111| or |001| at the next sample time. If |011| changes to |001|, then, as shown in the diagram of FIG. 8, the counter in FIGS. 6 and 7 will increment, causing the output of the following cell signal to be offset forward by one clock period, while the cell time during which the next control signals are created occurs one cell time later. The forward offset of one clock period means that the possible vectors that can be captured for the following unassigned cell signal are |110| and |100|. Note that if the vector for the following unassigned cell signal is |100|, then the control circuit will decrement the counter, and the following vector may be |001| or |011|. Thus, it is possible for the control circuit to oscillate between sampling at two adjacent cell times, and oscillate between the amounts of delay provided to subsequent unassigned cell signals, in order to continue tracking the eighth bit of the unassigned cell signals.

The diagram of FIG. 8 shows the primary jumps from |001| and |100| in solid arcs, and possible jumps, if one of the control signals was near metastability and settled to a different value the next time the control signal was created, as dashed arcs. Note that during the tracking mode, the decoding for the increment and decrement inputs to the counter in FIG. 6 is |001| and |100|, respectively.

Figure 9:
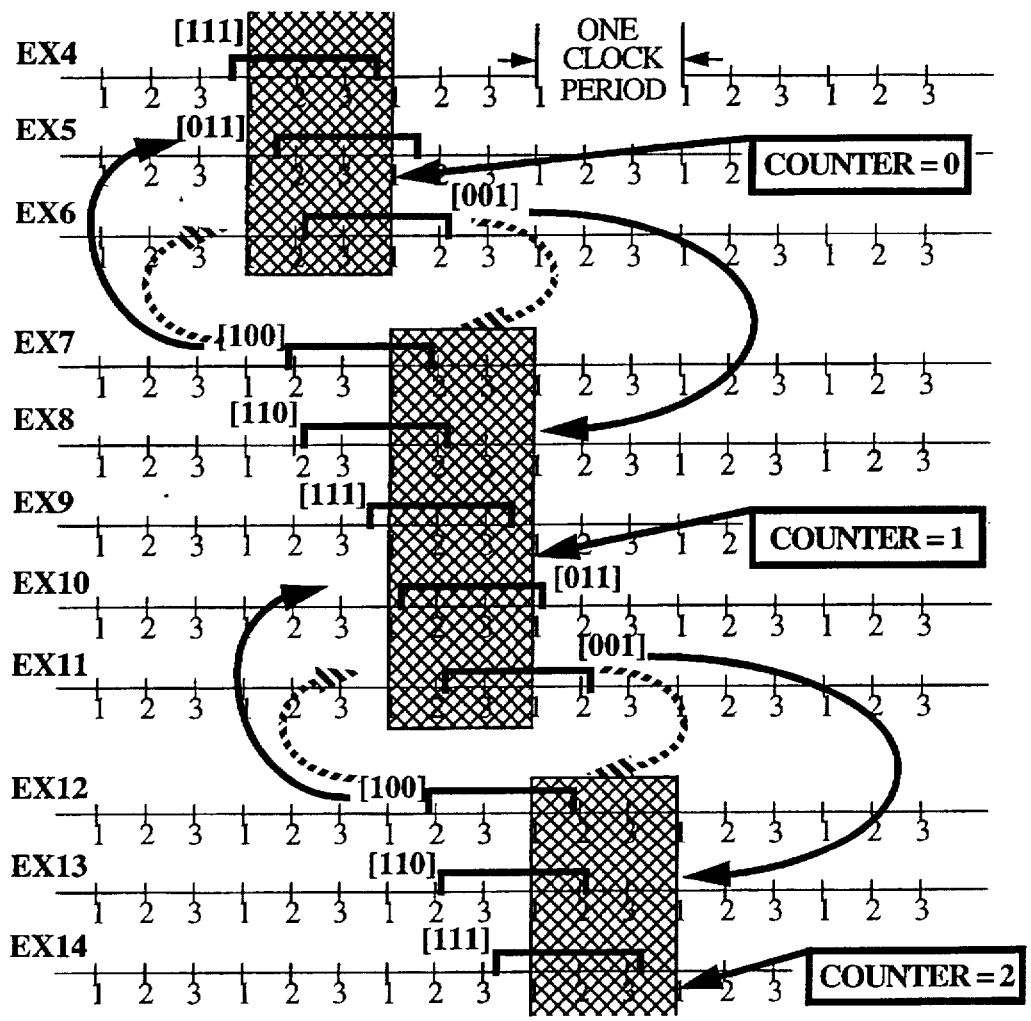
FIG. 9 is a linear presentation of the state diagram of FIG. 8.

FIG. 9 is a linear presentation of the state diagram of FIG. 8. In FIG. 9, there are eleven examples, EX4–EX14, of the phase between an unassigned cell signal and the start-of-cell marker. Vertical lines, or tick marks, are provided to show the times at which the skewed clocks sample the unassigned cell signals. The cross-hatched portions indicate the cell time during which the control signals are created. The vector [E F G] is noted for each example, with a crossbar indicating the placement of the eighth bit of each unassigned cell signal. FIG. 9 also illustrates the two vectors which can increment and decrement the counter. The use of solid and dashed arcs which indicate the incrementing or decrementing of the counter and the resulting next vectors follows the same convention as FIG. 8.

Beginning with EX4, the vector is |111| and the counter value is zero. If the cell signals begin to arrive later in time, then the timing of the cell signals will slowly evolve to EX5 with a vector of |011|. If the cell signals continue to arrive later and later, eventually, the timing shown in EX6 will be reached. The first time the vector of EX6 occurs, the counter will be incremented. With the counter value equal to one, the unassigned cell signal of EX6, which produced a vector of |001|, will now produce a vector of |100|, which is EX7, or |110|, which is EX8.

Note that to get to EX7 from EX6, the timing of the cell signals had to drift back across the Clk2 timing. Because the phase variations are expected to be slow relative to the clock rate, it is reasonable to expect many cases where the timing of the cell signals drift back and forth across the timing of one of the clocks. As a result, the counter is incremented, then decremented, then incremented, etc. FIG. 9 shows the timing of the cell signals drifting over more than one clock period to illustrate the tracking of these signals by the digital phase adjustment circuit.

Additionally, note the relationship in FIG. 9 between the tracking of the eighth bits of the unassigned cell signals and the selection of a sample signal. For EX4, the control circuit is sampling the sample signals when all three sample signals are high, |111|. As a result, the outputs of XOR1 and XOR2 will both be "0". Upon the assertion of "T", FF16 will output a "0", FF17 will output a "0", and select signal "J" will be a "1". Applying these signals to MUX1 results in the selection of sample signal "B". Thus, because the unassigned cell signal changed state between Clk3 and Clk1, sample signal "B" was selected. Referring again to EX4 of FIG. 9, it is clear that sample signal "B", which is created by Clk2, cleanly represents the value of the eighth bit of the unassigned cell signal.

In EX6, the unassigned cell signal changes state between Clk2 and Clk3. Hence, sample signal "A" should be selected. But as shown in EX6, sample signal "A" does not represent the eighth bit of the unassigned cell signal. Note, however, that as a result of the control signal vector value, the counter gets incremented so that the next cell signal is represented by EX7 or EX8, where sample signal "A" will cleanly represent the value of the eighth bit of the unassigned cell signal. In this manner, the digital phase adjustment circuit can track phase variations over several clock periods while continuously selecting a sample signal which accurately represents the cell signals but is not subject to metastability.

The complete digital phase adjustment circuit shown in FIG. 7 can be expanded to cover a larger range of phase shift between the input cell signal and the local clock by increasing the number of inputs to MUX2 and MUX3 and by increasing the number of bits in the delay select signal. The balance of the circuit remains the same. Thus, the circuit could accommodate two more clock periods of delay, for a total of about four clock periods, with the addition of two cell time signal inputs to MUX3, two more flip-flops feeding MUX2, and one more bit to the delay select signal. Thus, the circuit remains near the size of a IC chip pad even when it compensates for several clock periods of phase shift. In fact, if a circuit is designed to operate at 300 Mhz and compensate for up to seven clock periods of delay, a total of over twenty nanoseconds of delay can be handled without noticeably increasing the size of the circuit from that shown in FIG. 7.

Circuits are still needed to generate the cell time signals "3rd", "4th" and "5th", and the skewed clocks Clk1, Clk2 and Clk3. Because the cell time signals are just clock enable signals, the pulse shape and the time placement of the pulse edges are not very critical. For the preferred ATM embodiment, these signals can be generated from a modulo fifty-three counter and distributed in the same manner that the data on the chip is distributed. The start-of-cell marker is used to synchronize the modulo fifty-three counter.

Thus, the circuit for generating the cell time signals is relatively simple and small, on the order of twelve to fifteen flip-flop equivalents, which can be amortized over the IC chip.

The generation of the skewed clocks is more complicated, and must be accomplished in a way that can be reasonably distributed over the IC chip. Although it is possible to create the skewed clocks off-chip and have three clock pins on each IC package, on-chip generation results in higher clock speeds. On-chip generation reduces the tolerance of setting the clocking time interval and the contribution of off-chip clock drivers to the build-up of clock jitter tolerances, and reduces cross talk by reducing the length of the skewed clock distribution lines.

To create the skewed clocks on-chip, a delay line can be designed from a number of variable delay elements, such as inverters, such that the minimum delay provided by the delay line is equivalent to one period of an input clock. However, because IC chip gate delays typically vary by a four to one ratio, it is possible that the delay provided by the delay line will be equivalent to four periods of the input clock. A circuit can record how many delay elements it takes to delay the clock signal by one period, and then multiply that number by, for example, one third and two thirds to get the number of delay elements needed to skew the input clock by the one third and two thirds of a period, respectively. If an output tap is located between each pair of adjacent delay elements, then the circuit can select the appropriate taps to output the skewed clocks.

Note that this design can accommodate input clocks slower than the maximum expected clock speed. When a slower clock is used, such as during chip testing, and the circuit reports that the input clock period is longer than the delay provided by the delay line, the total number of delay elements in the delay line can be divided by three to set the skew times between each of the slower skewed clocks. As a result, positive transitions in the slower skewed clocks will be bunched together, skew times $t_1$ and $t_2$ being less than one third of their period.

However, for a given delay value of the delay line, the skew times between the slower skewed clocks will be at least as large as the skew times for faster skewed clocks.

The number of variable delay elements needed in the delay line to meet the time constraints for the digital phase adjustment circuit is a function of the expected values of $t_{RF}$, $t_f$, and the maximum input clock rate. However, if the values of $t_{RF}$ and $t_f$ are constant, then as the maximum input clock rate decreases, the number of taps on the delay line decreases, until, at the lower limit, the delay line has only two taps.

Figure 10:
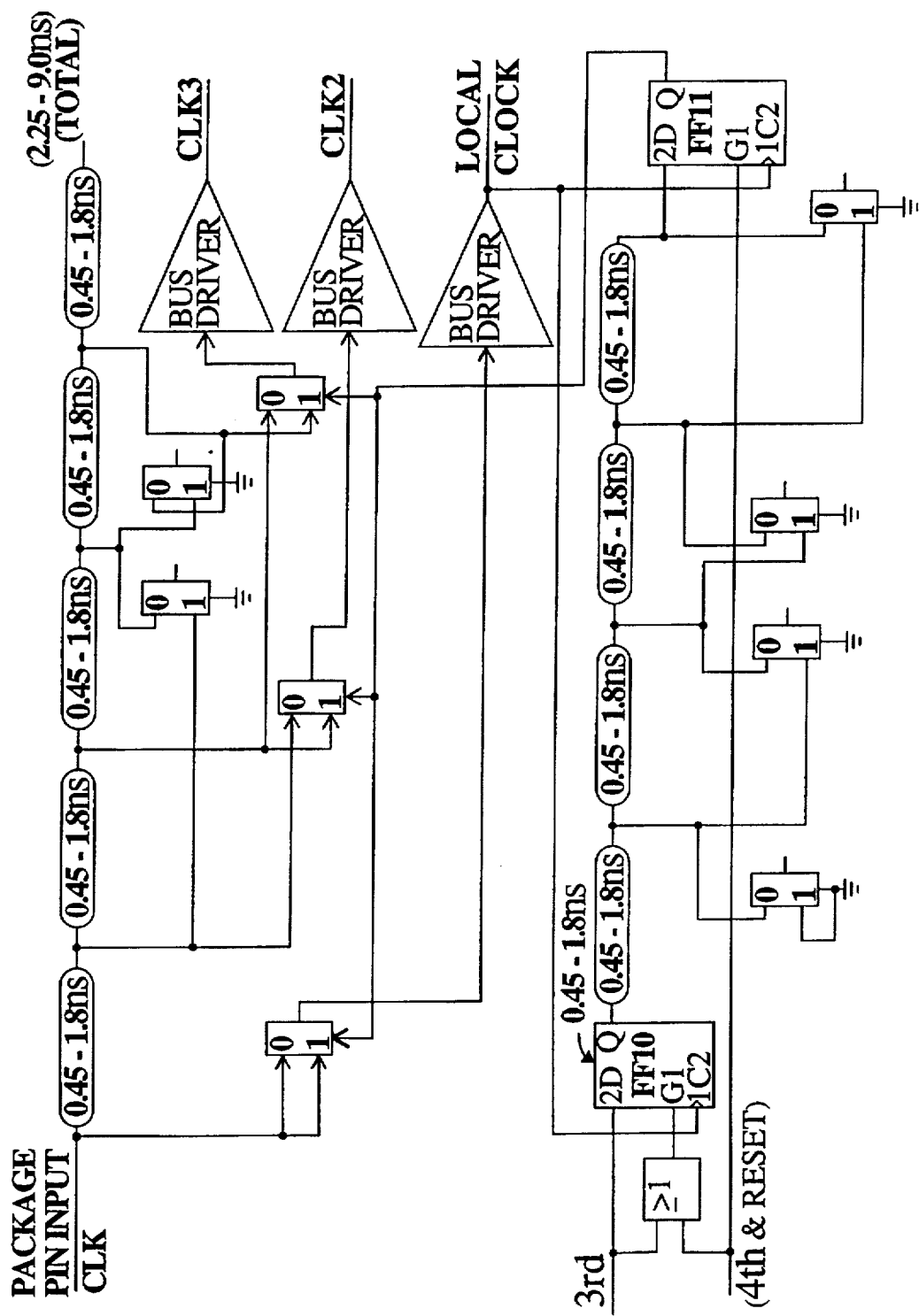
FIG. 10 shows a circuit for generating the skewed clocks for the data handling circuit.
Figure 11A:
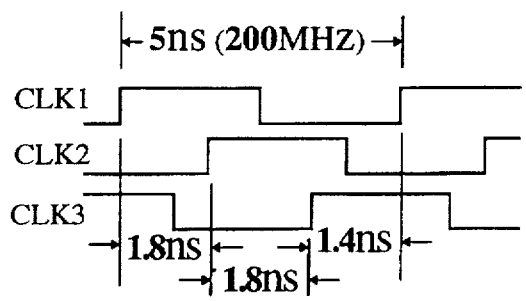
FIGS. 11A–D are timing diagrams for the circuit of FIG. 10.
Figure 11B:
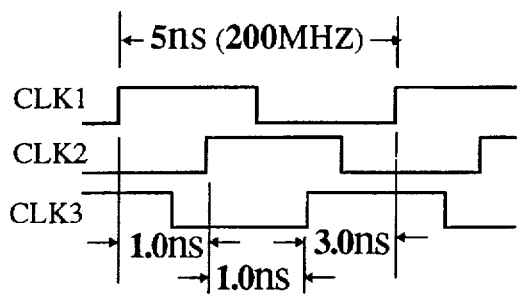
Figure 11C:
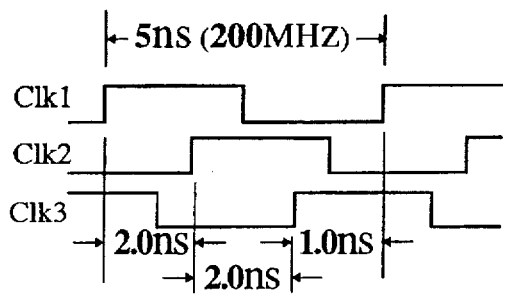
Figure 11D:
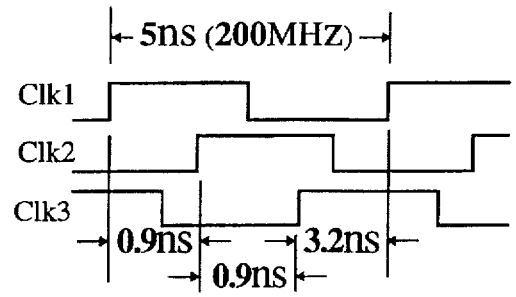

Using values for $t_{RF}$ and $t_f$ of 0.5 ns and 0.25 ns, respectively, and assuming a design for a maximum input clock rate of 200 Mhz, a circuit of the type shown in FIG. 10 can be used to generate the skewed clocks. Note that two delay lines are shown; one for skewing the input clock, and one for measuring the amount of delay currently provided. Because the two delay lines are located near each other on the IC chip, the provided delays are expected to be equal at all times. Thus, it is only necessary to measure the delay provided by one delay line.

For this circuit, there are only two time settings. One if the delay provided by the delay lines is less than the input clock period, and one if the provided delay is greater than the input clock period. As illustrated below, only three taps are necessary in order for the skew times between the skewed clocks to meet the time constraints of the data handling circuit of FIG. 5. The fourth tap is only connected to dummy loads to assure a matched circuit. For 0.8 micron CMOS processes, the delay range of 0.45 to 1.8 ns shown in FIG. 10 can typically be created from a pair of logic inverter circuits.

The circuit of FIG. 10 uses a flip-flop FF11 to determine whether the delay provided by the delay lines exceeds the input clock period. During the reset period, cell time signal "3rd" is applied to the input of FF10, and serves as its own clock gating signal. One clock period after cell time signal "3rd" goes high, cell time signal "4th" enables FF11, thereby determining whether the pulse in cell time signal "3rd" propagated to the data input of FF11 within one period of the input clock. If the delay provided by the delay line exceeds five nanoseconds (one period of the 200 MHz input clock), FF11 will be set to a "0", causing the first two taps to be selected for outputting the skewed clocks. If the delay does not exceed five nanoseconds, FF11 will be set to a "1", causing the second and third taps to be selected for outputting the skewed clocks. Note that the taps selected when FF11 is set to "0" are in closer proximity than the taps selected when FF11 is set to a "1".

This determination is only enabled during the system wide reset period to eliminate the possibility of fragmented clock pulses when FF11 changes states. Because the reset period is greater than several cell periods, this determination and selection process will occur several times before the reset period ends. For this reason, cell time signal "4th" also serves as a clock gating signal to FF10, which causes FF10 to sample cell time signal "3rd" just after it goes low, thereby setting the output of FF10 to a low. As a result, the data input of FF11 is reset to a low before the next determination and selection process begins.

Note that the propagation delay of FF10 is expected to match the propagation delay of one pair of logic inverter circuits, and the effect of any error in this match is small. Some error may also be introduced by skew between the clock and data input that causes FF11 to become metastable.

FIG. 11 illustrates the various skew times between the three clocks as the delay lines of FIG. 10 vary from their maximum (9.0 ns) to minimum (2.25 ns) delay values. If, for the particular circuit shown in FIG. 10 and its corresponding voltage and temperature conditions, the delay provided by the delay lines is at the maximum (9 ns), then the timing shown in FIG. 11A is correct. If the delay is five nanoseconds, and FF11 is a "0", then the timing shown in FIG. 11B is correct. If the delay is five nanoseconds, but FF11 is a "1", then the timing shown in FIG. 11C is correct. Finally, if the delay provided by the delay lines is at the minimum (2.25 ns), then the timing shown in FIG. 11D is correct. Thus, for a maximum clock rate of 200 Mhz and the given circuit delay values, the two time settings are sufficient to meet the minimum skew times $t_1$, $t_2$ and $t_3$ for the circuit of FIG. 5. Note that time constraint $t_{ST}$, shown in FIG. 4, is embedded in this skewed clock generating scheme.

If the circuit of FIG. 10 is tested at a clock rate slower than the maximum expected clock rate, and the slower clock operation is accompanied by an increase in clock jitter or longer rise and fall times, then additional taps may be needed as apparent to those skilled in the art.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. In a digital circuit for processing a stream of digital data cell signals, the digital circuit including a clock input for receiving a clock signal, a marker input for receiving a start-of-cell marker, and a cell signal input for receiving the stream of digital data cell signals, the improvement comprising: a circuit for adjusting a phase between the cell signals and the start-of-cell marker, wherein the circuit comprises means for sampling each cell signal a plurality of times during each period of the clock signal to create a plurality of sample signals, means for selecting one of the sample signals, means for delaying the selected sample signal, and means responsive to the sampling means for controlling the selecting means and the delaying means, the controlling means including means for determining whether each cell signal is an unassigned cell signal.

2. The digital circuit of claim 1 further including a plurality of cell signal inputs for receiving a plurality of streams of digital data cell signals substantially in phase with one another, the improvement further comprising: a sampling means, a selecting means, and a delaying means for each of said plurality of cell signal inputs, the controlling means being responsive to the sampling means of only one of said plurality of cell signal inputs for controlling the selecting means and delaying means of each of said plurality of cell signal inputs.

3. The digital circuit of claim 1 wherein the sampling means samples each cell signal only three times during each period of the clock signal.

4. The digital circuit of claim 3 wherein the sampling means has only two ranks of flip-flops.

5. The digital circuit of claim 3 wherein the sampling means has three ranks of flip-flops.

6. The digital circuit of claim 1 wherein the creation of each sample signal is separated from the creation of other sample signals by at least a minimum skew time, the creation of the selected sample signal being separated from a data transition in its corresponding cell signal by at least the minimum skew time.

7. The digital circuit of claim 1 wherein the controlling means includes means for sampling the plurality of sample signals during a specific cell time to create a plurality of control signals.

8. The digital circuit of claim 7 wherein the controlling means includes means for generating a delay select signal from the control signals, the delay select signal being indicative of a delay to be provided to the selected sample signal by the delaying means.

9. The digital circuit of claim 8 wherein the controlling means includes means for generating sample select signals from the control signals, the sample select signals being indicative of the sample signal to be selected by the selecting means.

10. The digital circuit of claim 9 wherein the controlling means creates the plurality of control signals and generates the sample select signals and the delay select signal within one period of the start-of-cell marker.

11. The digital circuit of claim 8 wherein the delay select signal controls the cell time during which the plurality of control signals are created.

12. The digital circuit of claim 11 wherein the plurality of control signals form a vector, the delay select signal being incremented when only a right-most bit of the vector is a one and decremented when only a left-most bit of the vector is a one.

13. The digital circuit of claim 12 wherein the delay select signal is incremented when two left-most bits of the vector are zeros and the controlling means is in a learning mode of operation.

14. A circuit configured for adjusting a phase between at least one stream of cell signals and a start-of-cell marker in a digital electronic circuit, the phase adjustment circuit comprising:

an input for receiving a local clock signal;

means for generating a plurality of skewed clocks from the clock signal;

means for sampling each cell signal in the at least one stream of cell signals with the skewed clocks to create a plurality of sample signals;

means for selecting one of the sample signals;

means for delaying the selected sample signal; and means responsive to the sampling means for controlling the selecting means and the delaying means, the controlling means including means for determining whether each cell signal is an unassigned cell signal.

15. The phase adjustment circuit of claim 14 further comprising: a sampling means, a selecting means, and a delaying means for each of a plurality of streams of cell signals provided to said phase adjustment circuit, the controlling means being responsive to the sampling means of said at least one stream of cell signals for controlling the selecting means and the delaying means of each of the plurality of streams of cell signals.

16. The phase adjustment circuit of claim 14 wherein the generating means comprises:

a delay line for providing delay to the clock signal, the delay line having a plurality of variable delay elements and a plurality of taps, each tap being positioned between a pair of adjacent delay elements;

means for determining whether the delay provided by the delay line exceeds the period of the clock signal; and selecting means responsive to the determining means for selecting a plurality of taps for outputting a plurality of skewed clocks.

17. The phase adjustment circuit of claim 16 wherein the plurality of taps selected when the delay of the delay line exceeds the clock signal period are closer together than the plurality of taps selected when the delay of the delay line does not exceed the clock signal period.

18. The phase adjustment circuit of claim 17 wherein the delay line has only three taps.

19. A circuit for generating a plurality of skewed clock signals from an input clock signal having a period, the circuit comprising:

a delay line for providing delay to the input clock signal, the delay line having a plurality of variable delay elements and a plurality of taps, each tap being connected between a pair of adjacent delay elements, said circuit being configured for determining whether the delay provided by the delay line exceeds a predetermined time limit and for selecting a plurality of taps for outputting the plurality of skewed clock signals, said circuit selecting a first plurality of taps when the delay provided by the delay line exceeds the predetermined time limit and a second plurality of taps when the delay provided by the delay line does not exceed the predetermined time limit, whereby each skewed clock signal is skewed from the input clock signal by less than the input clock signal period.

20. The circuit of claim 19 wherein the first plurality of taps are in closer proximity than the second plurality of taps.

21. The circuit of claim 20 wherein the second plurality of taps are separated from one another by twice as many delay elements as the first plurality of taps.

22. The circuit of claim 21 wherein the first and second plurality of taps have at least one tap in common.

23. The circuit of claim 19 wherein the predetermined time limit is the input clock signal period.

24. The circuit of claim 23 further configured for determining whether the delay provided by the delay line exceeds the input clock signal period only during a reset period.

25. The circuit of claim 19 wherein the delay line has a total minimum delay substantially equal to the input clock signal period.

26. A digital circuit including a clock input for receiving a clock signal having a predetermined period, a cell time input for receiving a cell time marker, and at least one cell signal input for receiving a stream of digital data cell signals, said digital circuit being configured for determining whether each data cell signal is an unassigned data cell signal and whether said unassigned data cell signal has a predetermined data pattern substantially in phase with said cell time marker, and for adjusting the phase between said stream of digital data cell signals and said cell time marker in both whole and fractional increments of said clock period only when said cell signal input is receiving an unassigned data cell signal.

27. The digital circuit of claim 26 further including a data handling circuit and a control circuit, said data handling circuit being configured for sampling each cell signal a plurality of times to create a plurality of sample signals, for selecting one of the sample signals, and for delaying the selected sample signal, said control circuit being responsive to the sample signals created by said data handling circuit for controlling the selection of one of the sample signals and the delaying of the selected sample signal by said data handling circuit.

28. The digital circuit of claim 27 further including a plurality of inputs for receiving a plurality of streams of digital data cell signals generally in phase with one another, and a separate data handling circuit for each cell signal input, wherein said control circuit is responsive to the sample signals created by only one of said data handling circuits for controlling the selections and delays made by each data handling circuit.

29. The digital circuit of claim 26 wherein said cell time marker is a start-of-cell marker.

30. A method for phase adjustment in a digital circuit having a clock input for receiving a clock signal having a clock period, a cell signal input for receiving a digital data cell signal, and a cell time input for receiving a cell time marker, the method comprising the steps of:

determining whether said digital data cell signal is an unassigned data cell signal having a predetermined data pattern;

detecting a phase between said cell time marker and said unassigned data cell signal; and adjusting the phase between said cell time marker and said unassigned data cell signal in both whole and fractional increments of said clock period using said predetermined data pattern.

31. The method of claim 30 wherein said digital circuit includes a plurality of cell signal inputs for receiving a plurality of digital data cell signals substantially in phase with one another, the detecting step includes the step of detecting the phase between only one of said digital data cell signals and said cell time marker, and the adjusting step includes the step of adjusting the phase between all of said digital data cell signals and said cell time marker.

* * * * *